US006467022B1

United States Patent
Buckland et al.

(10) Patent No.: US 6,467,022 B1
(45) Date of Patent: Oct. 15, 2002

(54) EXTENDING ADAPTER MEMORY WITH SOLID STATE DISKS IN JBOD AND RAID ENVIRONMENTS

(75) Inventors: Pat Allen Buckland, Austin, TX (US); Ian David Judd, Winchester (GB); Gary Robert Lyons, Leander, TX (US); Renato John Recio; Michael Francis Scully, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/706,111

(22) Filed: Nov. 3, 2000

Related U.S. Application Data

(62) Division of application No. 09/061,697, filed on Apr. 16, 1998, now abandoned.

(51) Int. Cl.[7] .............................................. G06F 12/08
(52) U.S. Cl. ............................................ 711/113; 711/2
(58) Field of Search .......................... 711/2, 4, 104–105, 711/100–101, 111–114, 117–118, 133, 159, 161–162; 714/6; 710/62; 707/204

(56) References Cited

U.S. PATENT DOCUMENTS

| | | | | |
|---|---|---|---|---|
| 5,420,998 A | * | 5/1995 | Horning | 711/113 |
| 5,628,014 A | * | 5/1997 | Cecchini et al. | 707/205 |
| 5,754,753 A | * | 5/1998 | Smelser | 714/8 |
| 5,754,888 A | * | 5/1998 | Yang et al. | 710/52 |
| 6,148,368 A | * | 11/2000 | DeKoning | 711/113 |

* cited by examiner

Primary Examiner—Matthew Kim
Assistant Examiner—Denise Tran
(74) Attorney, Agent, or Firm—Volel Emile; Bracewell & Patterson, L.L.P.

(57) ABSTRACT

A Solid State Disk ("SSD") and accompanying logic to extend the local memory of an adapter for RAID storage devices. Use of virtual memory, representing the SSD range of addresses in the adapter address memory, allows the adapter to incorporate the total memory into the adapter memory structure. The SSD is non-volatile and large amounts of cache items may be transferred to the SSD as an extension of the adapter memory. The cache write may be delayed and subsequently written to a designated address on a RAID drive, freeing the adapter on-board memory and control functions. Further, the size of the SSD allows for large amounts of data staging and storage, permitting device-to-device communications that would reduce the read and write commands between the host, adapter and drives.

8 Claims, 9 Drawing Sheets

EXTENDING ADAPTER MEMORY WITH SOLID STATE DISKS IN JBOD AND RAID ENVIRONMENTS

This is a Division of application Ser. No. 09/061,697, filed Apr. 16, 1998, now abandoned.

BACKGROUND OF THE INVENTION

1. Technical Field

The present invention relates in general to hard drive adapter/controllers for data processing systems and in particular to speed matching data transfers from data processing systems to memory devices connected via an adapter/controller. Still more particularly, the present invention relates to the expansion and use of the adapter memory to manage and implement data and instructions with a disk array.

2. Description of the Related Art

Adapter/controllers, hereinafter referred to as adapters, usually implemented on a printed circuit board, are often employed in today's data processing systems to interface between the data processing unit and an external bus. Various peripherals, including disk drives, may be attached to the external bus and thereby indirectly connected to the processing unit. One example of such a configuration is a Peripheral Component Interface ("PCI") adapter and bus. The PCI bus allows attached PCI-compliant devices to perform tasks concurrently with the data processing unit.

Slots used to connect the adapter to the PCI bus are of a predetermined length which, along with internal space limitations within the data processing system, limits the physical area of the printed circuit board. Consequently, the amount of memory that an adapter board may include is limited by the amount of space available to the memory component. There are typically two memory caches on a PCI adapter: a Random Access Memory ("RAM", either static or dynamic) buffering incoming data received from the data processing system and a non-volatile RAM ("NVRAM"), where the NVRAM is smaller and faster than the RAM and buffers writes to disk drives connected to the PCI bus.

Disk drives attached to the PCI bus may employ different configurations. "JBOD", an acronym for Just a Bunch of Drives referring to multiple hard disk drives connected to an adapter on the data processing unit with no special treatment of data among the disks, is one such configuration. A disk array or Redundant Array of Independent Disks ("RAID"), a group of hard disk drives controlled by a single adapter and controller (a device falling within the meaning of the term "adapter" as used herein) and combined to achieve higher transfer rates than a single drive, is another. In the latter configuration, even though multiple disks are controlled by one adapter, the RAID system appears as one drive to the data processing system. Depending on the configuration, the RAID system will increase the level of protection and storage capacity for a data processing system over a single hard disk drive. The primary functions of the RAID system are to increase the availability, protection and storage capacity of data for a data processing system.

RAID technology generally splits data among the drives according to the format of the particular RAID classification (RAID 1, 2, 3, 4, 5). Copies or portions of data may be stored on more than one disk, a process referred to as "striping," which prevents data loss in case a disk fails. By storing the data and instructions on multiple drives, access to the data is also enhanced by performing operations in parallel with multiple drives.

The RAID system, as discussed above, is an improvement over a single magnetic disk drive. However, magnetic drives, employed alone or in RAID configurations, are primarily mechanical devices, using read/write heads to transfer data, and are slow compared to Dynamic Random Access Memory ("DRAM") or other electronic memory of the type generally employed in a data processing system. Write operations to magnetic disk drives could cause significant delays on the system bus of a data processing system utilizing the adapter and magnetic disk drive. In RAID configurations, the problem is further complicated by the striping requirements. In order to accomplish one system write to a RAID 5 disk array, for example, two drive reads and two drive writes are required, each read and write taking 10–15 milliseconds.

Write caching is therefore often employed to reduce the disparity in transfer time between the system and the disk/RAID storage device. The write cache (e.g., the NVRAM) on an adapter is employed to buffer write transactions received from the data processing system to the attached disk drives. With write caching, the adapter may complete the system-side write in 0.25–1.0 milliseconds. Because of the space limitations described above, however, the size of a write cache which may be employed is limited. The problem with a small cache is that writes are received from the data processing system every 1.0 ms and transferred to the magnetic disk drives every 35 ms. At these rates, the write cache fills up very quickly and the system is again forced to absorb the 35 ms latency associated with writing to a magnetic disk drive. RAID configurations, which employ multiple magnetic drives in parallel, may improve the latency down to 3.5 ms, but still suffer the limitations relating to write cache size.

Any gains achieved by RAID configurations may be somewhat offset by the requirements of multiple operations for each write. FIG. 8 depicts a high level flowchart for the process of a write operation to a standard RAID storage device in accordance with the known art. The process begins in step 800, which depicts the adapter reading old data on the data drive. The process continues to step 802, which illustrates the adapter writing new data to the data drive. The process passes to step 804, which depicts the adapter reading the parity associated with the old data from the parity drive. Next, the process passes to step 806, which illustrates the adapter XORing the old and new data and old parity. Continuing, the process proceeds to step 808, which depicts the adapter XORing the results from step 806 with parity from step 802.

The write operation depicted in FIG. 8 takes four steps occupying and restricting the adapter function. The inherent latency (time interval between initiation of a call for data and the time the actual transfer starts) due to the slowness of the magnetic disk drives and the extra steps required to complete a write, illustrate the amount of time consumed in the RAID write function. The instructions and data must access the adapter even if a drive-to-drive function were executed.

It would be desirable, therefore, to provide a method and apparatus for extending the NVRAM of the adapter and limiting the number of command/data transmissions and command parsing. It would further be desirable to decrease the latency of the RAID storage device with respect to the data processing system.

SUMMARY OF THE INVENTION

It is therefore, one object of the present invention to provide an extension to the adapter memory.

It is a further object of the present invention to provide logic that will relocate some instructions and designated storage areas from the adapter to the SSD.

Still further, it is an object of the present invention to decrease latency between the adapter and the RAID storage device by transferring data to the SSD and write functions to a data drive in the RAID storage device.

The foregoing objects are achieved as now described. The present invention incorporates the use of a Solid State Disk ("SSD") and accompanying logic to extend the local memory of an adapter for RAID storage devices. Use of virtual memory, representing the SSD range of addresses in the adapter address memory, allows the adapter to incorporate the total memory into the adapter memory structure. The SSD is non-volatile and large amounts of cache items may be transferred to the SSD as an extension of the adapter memory. The cache write may be delayed and subsequently written to a designated address on a RAID drive, freeing the adapter on-board memory and control functions. Further, the size of the SSD allows for large amounts of data staging and storage, permitting device-to-device communications that would reduce the read and write commands between the host, adapter and drives. Still further, in an alternate configuration, the invention shifts most of the write function from the adapter out to a data drive in the RAID storage device. The adapter sends a command to a data drive that allows the data drive to perform all the write steps and the data drive only accesses the adapter when transmitting a complete signal, thus reducing the number of adapter accesses.

The above as well as additional objects, features, and advantages of the present invention will become apparent in the following detailed written description.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
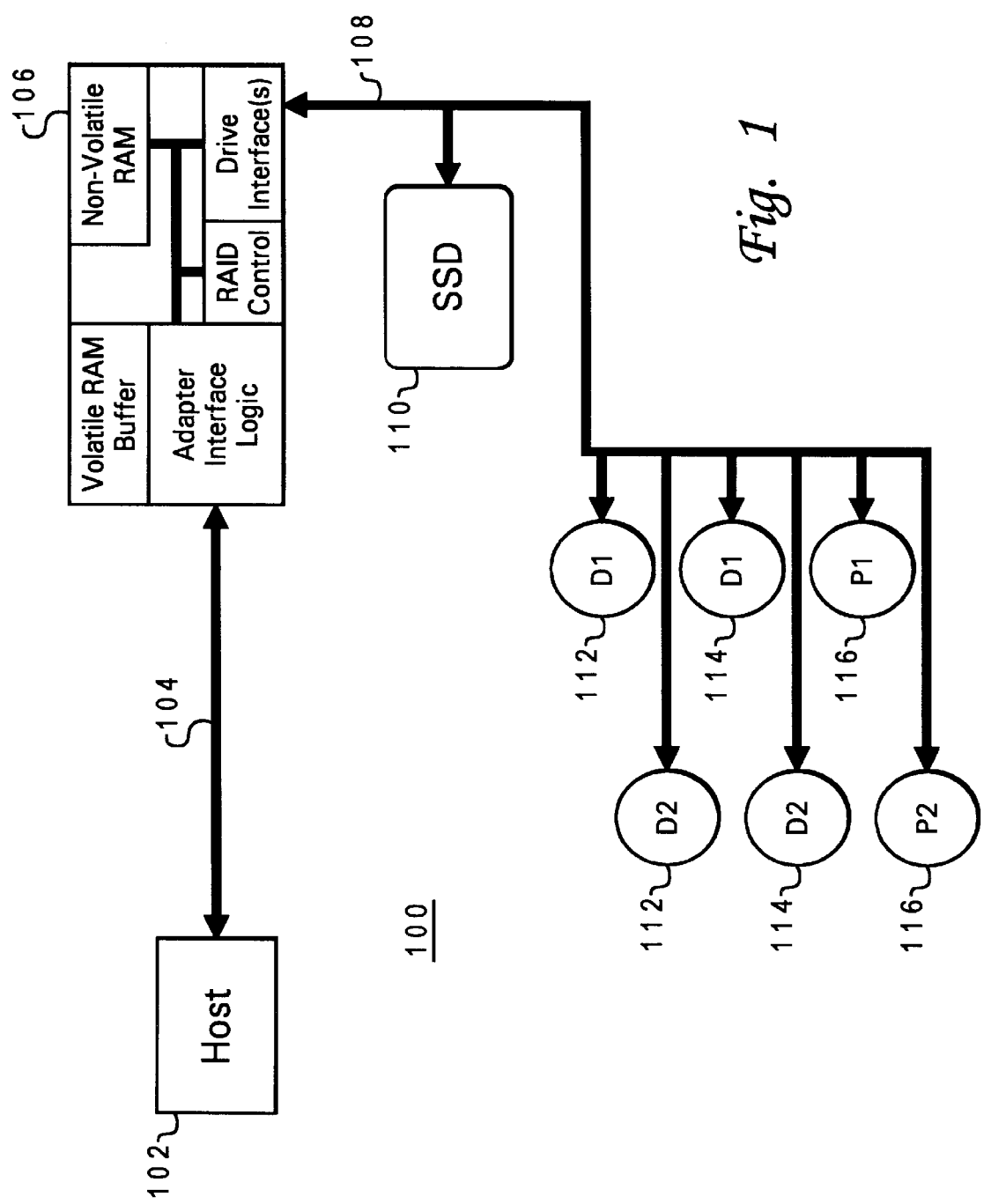
FIG. 1 is a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. The exemplary embodiment depicted includes a host system 102 connected via system bus 104 to adapter 106. Read and write commands and data are transferred from host 102 via system bus 104 to adapter 106. The commands are received by adapter 106 and written to the RAM and NVRAM buffers/memory cache. Stored within the NVRAM of adapter 106, in a virtual memory scheme, is the range of addresses on Solid State Disk (SSD") 110. The adapter 106 communicates with SSD 110 and RAID storage drives 112, 114, and 116, via external bus 108, a Direct Access Storage Device ("DASD") Bus. The adapter may control multiple RAM storage devices, depending on the number of DASD busses connected.

The adapter writes commands to the proper drive and the memory in SSD 110. The SSD 110 becomes an extension of the onboard NVRAM of adapter 106. The adapter 106 reads SSD 110 as adapter memory that is stored externally and treats SSD 110 as a slow memory device. Also, as the adapter receives write commands from host 102, it stores them in the small NVRAM (write-back cache) and returns completion to host 102. Eventually, NVRAM will fill and need to be freed. The adapter 106 flushes part of the NVRAM to SSD 110, thereby freeing up the faster NVRAM on board adapter 106.

The SSD extends the limited NVRAM onboard the adapter, by flushing commands that are less critical to the SSD. This will free up the faster memory, NVRAM, on board the adapter which will in turn speed up the command processing speed.

Figure 2:
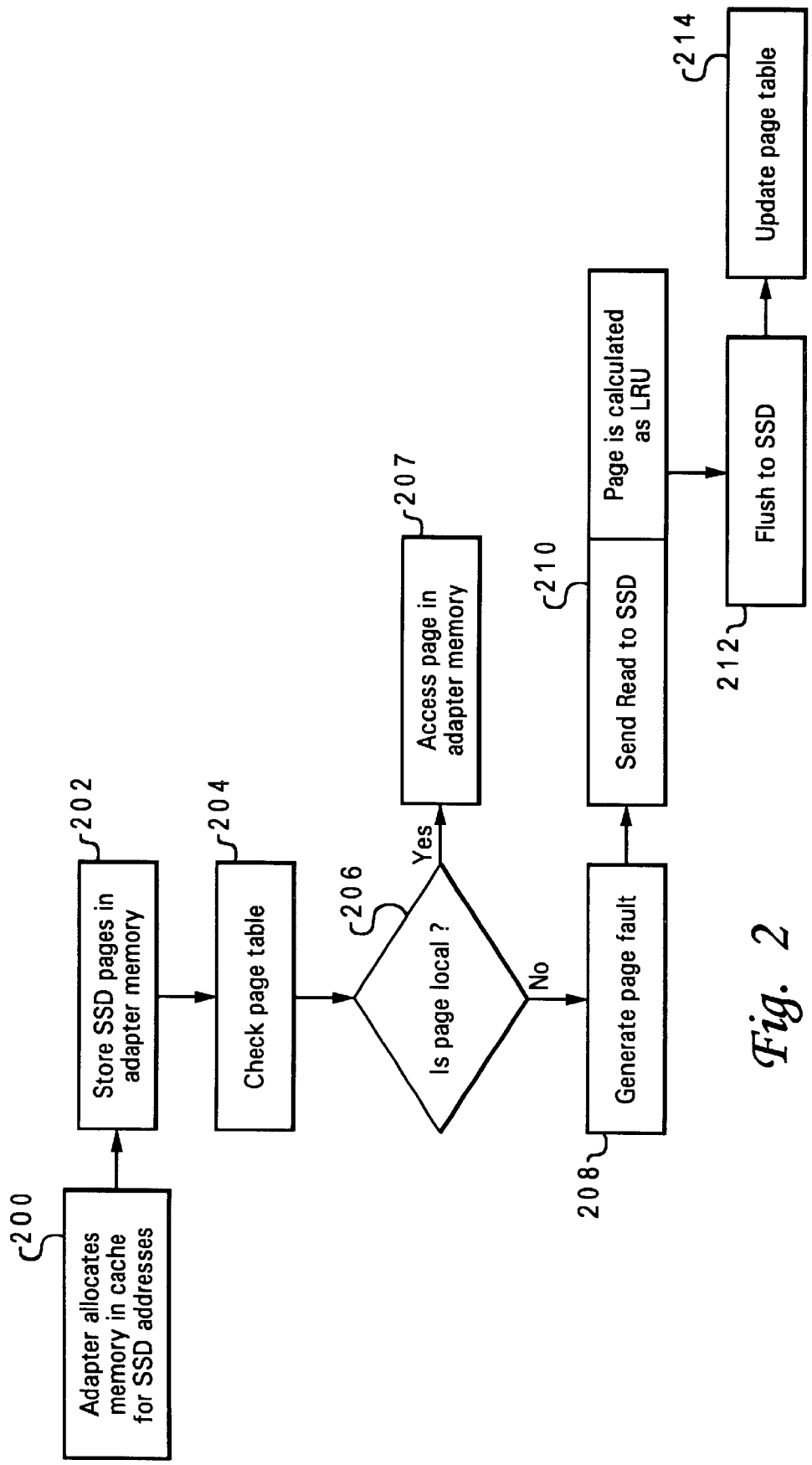
FIG. 2 depicts a high level flow diagram for a process of allocating a portion of adapter memory representing the SSD range of addresses through virtual memory addressing in accordance with a preferred embodiment of the present invention.

Referring to FIG. 2, a high level flow diagram for a process of allocating a portion of adapter memory representing the SSD range of addresses through virtual memory addressing in accordance with a preferred embodiment of the present invention is illustrated. The process begins at step 200, which depicts allocation by the adapter, when the SSD is installed in the data processing system, of a range of memory-addresses in the adapter memory to represent the range of SSD addresses. The process continues in step 202, which illustrates the adapter storing currently accessed pages of memory in both the RAM and the NVRAM on board the adapter and the SSD as an extension of the NVRAM. The process then proceeds to step 204, which depicts checking a page table when a particular page of memory is needed by the adapter to determine if the page is local, in adapter memory, or if the page is located on the SSD.

The process then passes to step 206, which illustrates a determination of whether the desired page is local. If the page is local, then the process proceeds to step 207, which depicts the adapter accessing the page within the adapter memory. If the page is not local, however, the process proceeds instead to step 208, which illustrates the adapter generating a page fault. The process then proceeds to step 210, which depicts the adapter sending a read command to the SSD to access the page in the SSD memory, and at the same time, checking the page to determine if the desired page is a Least Recently Used ("LRU") page, also referred to as "destaging". The process passes next to step 212, which illustrates the page, if a destaged block, being flushed to the SSD. This process then passes to step 214, which depicts updating the adapter's page table to reflect that the page is no longer in a local memory.

Figure 3:
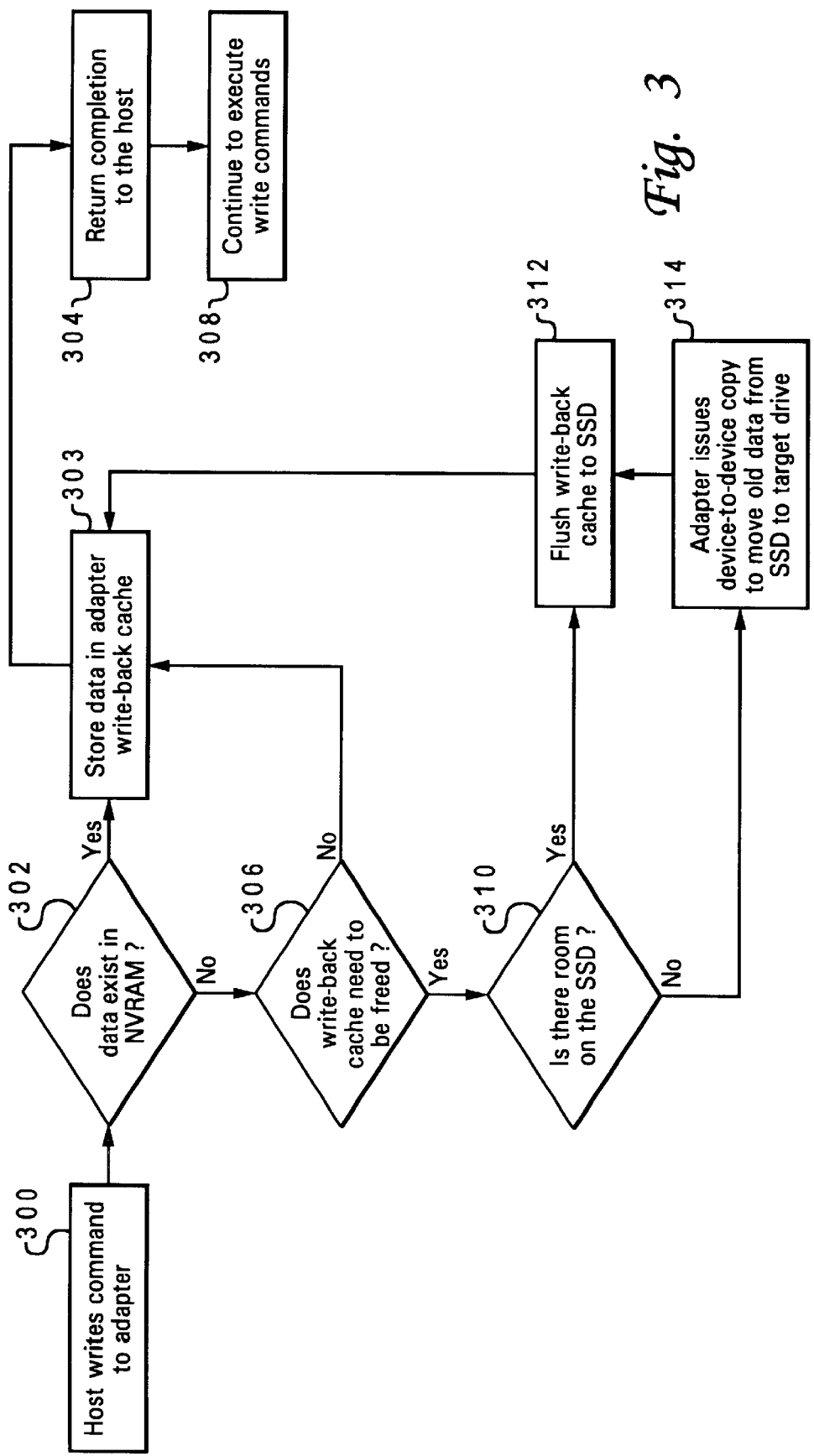
FIG. 3 is a high level flow diagram for implementing a write command in the SSD environment in accordance with a preferred embodiment of the present invention.

With reference now to FIG. 3, a high level flow diagram for implementing a write command in the SSD environment in accordance with a preferred embodiment of the present invention is depicted. This process may be performed in the exemplary environment as depicted in FIG. 1. The flow diagram of FIG. 3 should be considered together with FIG. 1. The process, whereby an SSD is it incorporated into a RAID environment for the purpose of extending the onboard adapter memory, is shown in FIG. 3. The process begins in step 300, which depicts the host system 102 sending a write command to the adapter 106. The process passes next to step 302, which depicts the adapter checking to determine whether destination location already exists in the NVRAM. The process continues next to step 303, which illustrates the command being stored in adapter 106 write-back cache (not shown). If so, the process continues to step 304, which illustrates adapter 106 sending a completion signal to the host. The process passes to step 308, which depicts host 100 continuing to execute write commands.

Referring again to step 202, if the destination location for the instruction does not exist in NVRAM, the process continues instead to step 306, which illustrates a determination of whether sufficient room exists in the NVRAM for the received command. As the write-back cache receives and executes more write commands, eventually the NVRAM will fill and has to be freed up. The destage algorithm is used to determine which block(s) need to be removed. Adapter 106 flushes the NVRAM to SSD 110. With the freed up NVRAM, adapter 106 then writes the new data from the host to the NVRAM.

If the NVRAM (write-back cache) is full, the process next passes to step 310, which illustrates a determination of whether sufficient room exists on the SSD. If there is sufficient room, the process continues to step 312, which depicts adapter 106 flushing the NVRAM to the SSD to free up space on the NVRAM. If there is no room on the SSD, the process continues instead to step 314, which illustrates adapter 106 issuing a device-to-device copy to move the old data from the SSD to the target drive, thereby freeing up space on the SSD. The process proceeds to step 303, as the adapter (write-back cache) stores the new data in the NVRAM (write-back cache). The process passes next to step 304, which depicts the SSD returning a completion signal to the host and allowing write commands to continue execution. The SSD 110 would then be free to receive the flushed data. Completing a write operation using the above process requires a read to be issued to SSD 110, as well as reads to both data 112 and parity 116 drives.

Figure 4:
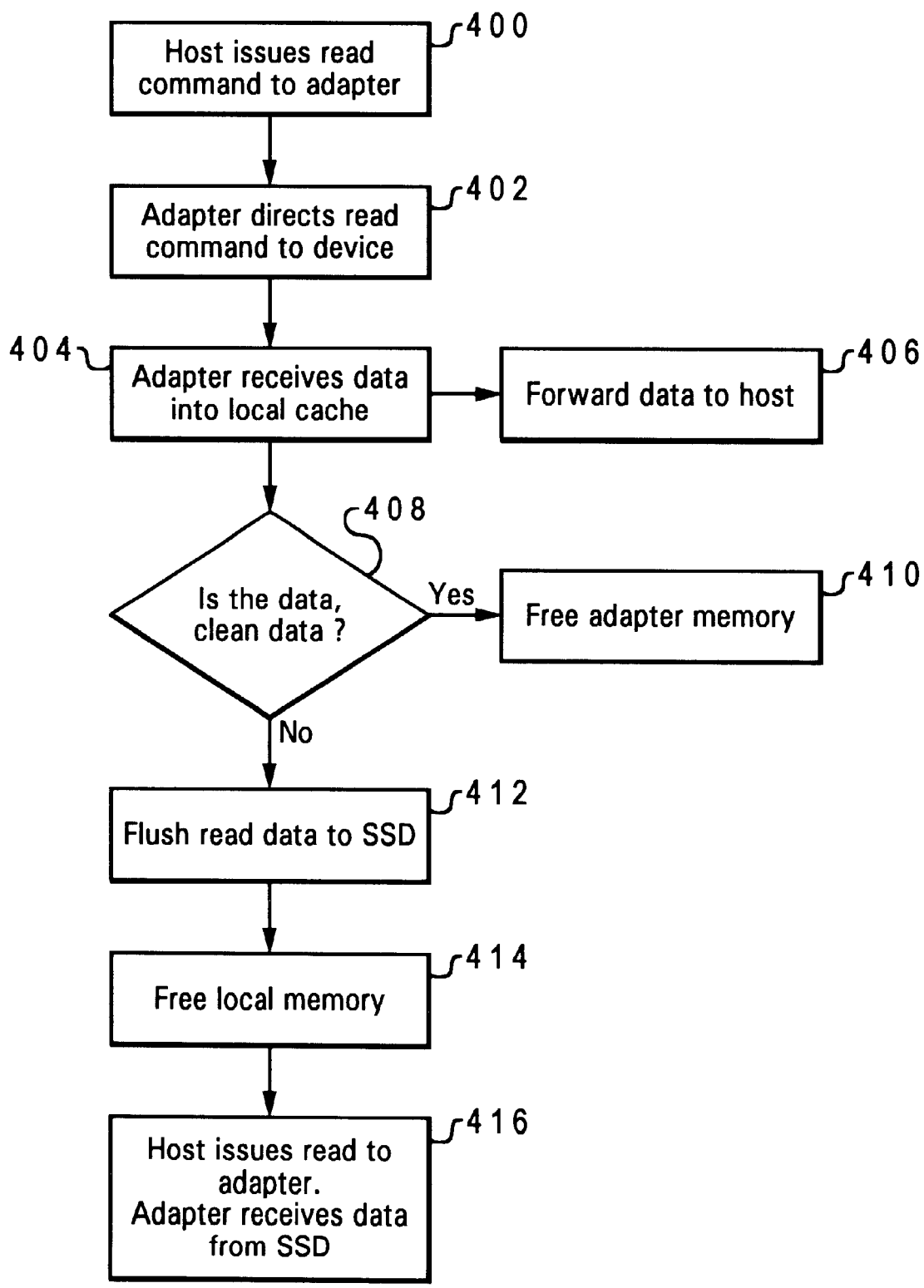
FIG. 4 depicts a high level flow diagram for employing an SSD in a read command in accordance with a preferred embodiment of the present invention.

Referring now to FIG. 4, a high level flow diagram for employing an SSD in a read command in accordance with a preferred embodiment of the present invention is depicted. FIG. 4 should be considered along with FIG. 1, the block diagram of the present invention. The process begins at step 400, which depicts a read command being issued by host 100 to adapter 106 via system bus 104. The process next passes to step 402, which illustrates adapter 106 directing a read command to the proper device in the storage system. The process continues in step 404, which depicts adapter 106 receiving the read data into its local cache. The process next passes to step 406, which illustrates adapter 106 forwarding the read data to host 100.

Adapter 106 memory will need to be freed at some point in response to a destaging algorithm calculation. The process therefore proceeds next to step 408, which depicts adapter 106 determining whether the data read from the drive is clean data. If so, the process next passes to step 410, which illustrates freeing the adapter memory. If not, however, the process proceeds instead to step 412, which depicts flushing the read data to SSD 110. The process next passes to step 414, which illustrates freeing the local memory of adapter 106 by virtue of having flushed the data to SSD 110. The process passes next to step 418, which illustrates host 102 issuing a read command to adapter 106, and adapter 106 receiving the requested data from SSD 110 rather than data drive 112, reducing the read time as seen by host 102.

Using this technique, adapter 106 is in complete control of the data storage location. By flushing the read data to the faster memory of SSD 110, the command transfer process speeds up dramatically over retrieval from data drives 112 in the RAID storage device. The SSD 110 becomes an extension of the local cache within adapter 106 and acts as a slightly slower cache.

Figure 5:
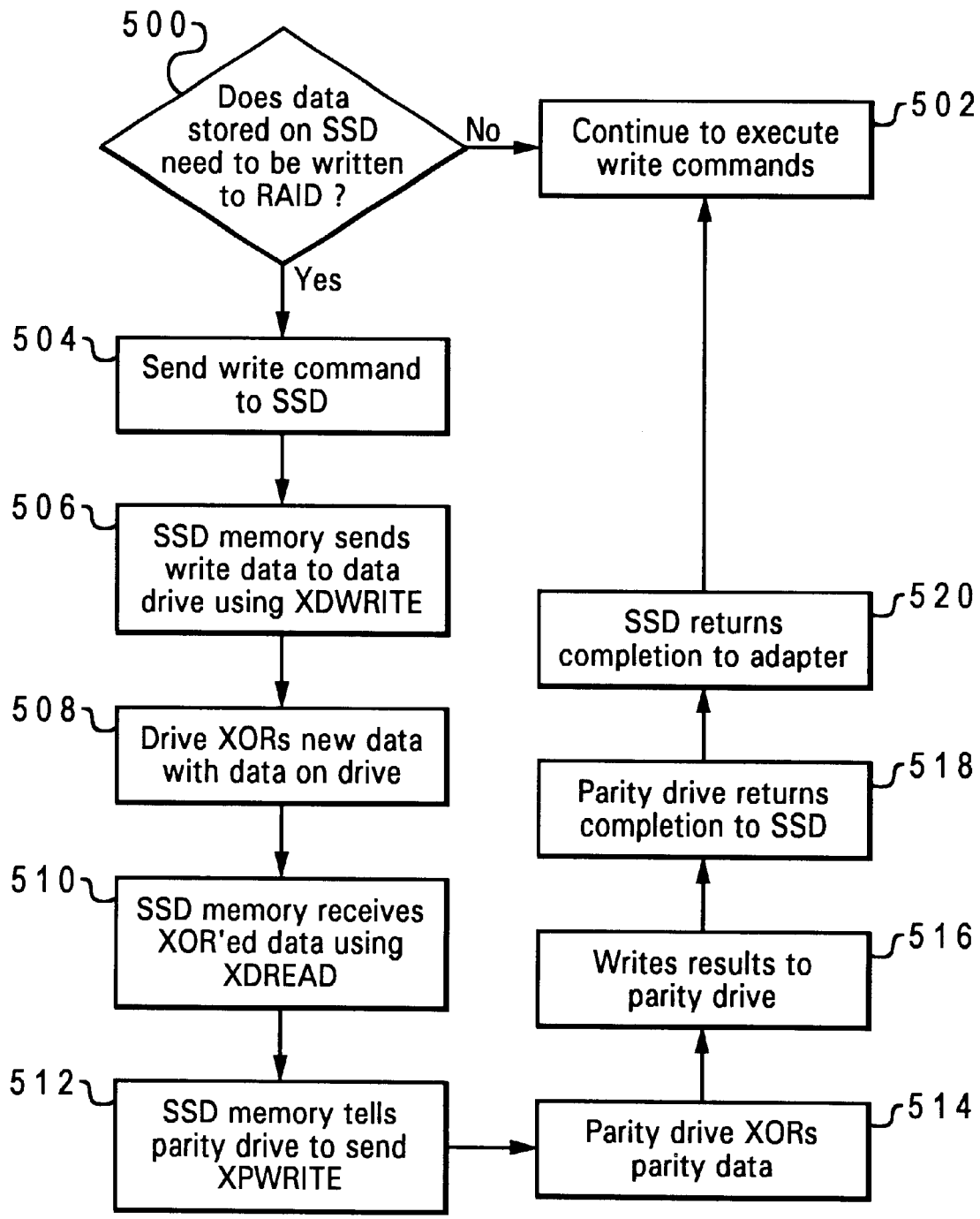
FIG. 5 a high level flow diagram for a process employing special commands to reduce the adapter transactions in a write operation in accordance with a preferred embodiment of the present invention.

With reference now to FIG. 5, a high level flow diagram for a process employing special commands to reduce the adapter transactions in a write operation in accordance with a preferred embodiment of the present invention is depicted. Commands, implemented within the SCSI standard, XDWRITE, XDREAD and XPWRITE (these commands are more fully explained in the SCSI standard and will not be further detailed here), also called "RAID primitives," are utilized to reduce the total number of operations by transferring the XOR calculations from the adapter to the drive. If RAID primitives are used the reduced adapter instruction steps result, as depicted in FIG. 5. FIG. 1 should be considered as the flow diagram of FIG. 5 is explained.

The process begins at step 500, depicting adapter 106, which implements RAID primitives, receiving a write command and determining whether the data needs to be offloaded to the RAID storage device. If the data does not need to be offloaded the process proceeds to step 502, which illustrates host 102 continuing to generate write commands. If the data does need to be written to a RAID storage device, the process instead proceeds to step 504, which depicts a Write command being sent to the SSD 110. The process then proceeds to step 506, which depicts adapter 106 sending write data to the data drive using the XDWRITE command. The process continues to step 508, which depicts the data drive XORing the new data with the data on the drive. The process proceeds to step 510, where the SSD, using the XDREAD command receives the XOR'ed data. Continuing in the process to step 512, adapter 106 is depicted as signaling the data drive that contains the RAID primitives to send the XPWRITE command to parity drive 116.

Next the process passes to step 514, which illustrates the parity drive XORing the parity data. The process next proceeds to step 516, which depicts the parity drive writing the results to itself and continuing to step 502, which depicts signaling completion to adapter 106 and adapter 106 continuing to execute write commands. The process continues to step 518, which illustrates the parity drive returning completion to the SSD. The process proceeds to step 520, depicting the return of completion by the SSD.

The above described process still uses the adapter in writing to the RAID storage device. However, the onboard NVRAM has been extended by the SSD memory and the RAID primitives. This procedure helps alleviate some of the adapter and cache utilization issues by moving the XOR calculation off the adapter and requiring fewer local cache buffers.

Another aspect of the invention is that of staging the write data to the SSD and transferring control of the RAID write commands and parity calculations to a data drive in the RAID storage device. The adapter issues an initial command to the data drive that transfers control to the data drive. When the function is finished, the data drive sends a completion signal to the adapter.

Figure 6B:
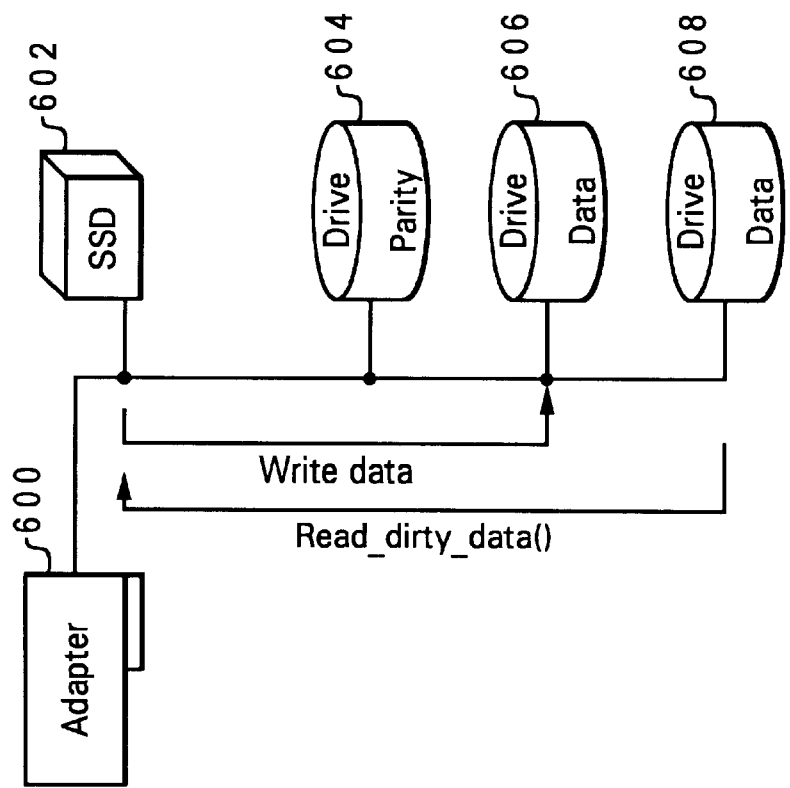
FIGS. 6A, 6B and 6C depict block diagrams illustrating the process and configuration whereby the RAID commands are transferred to the RAID storage device in accordance with a preferred embodiment of the present invention.
Figure 6A:
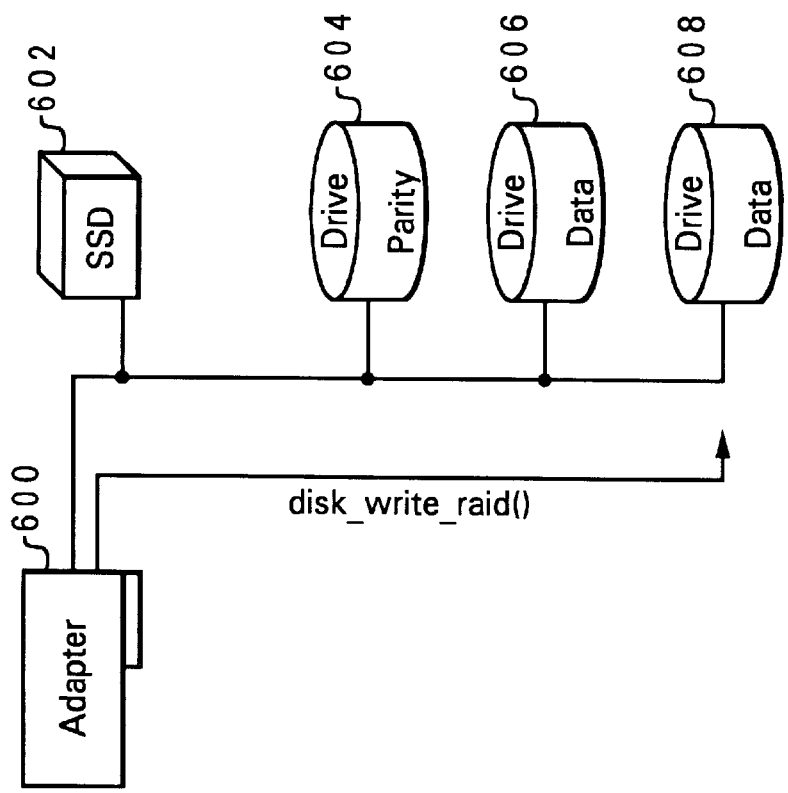
Figure 6C:
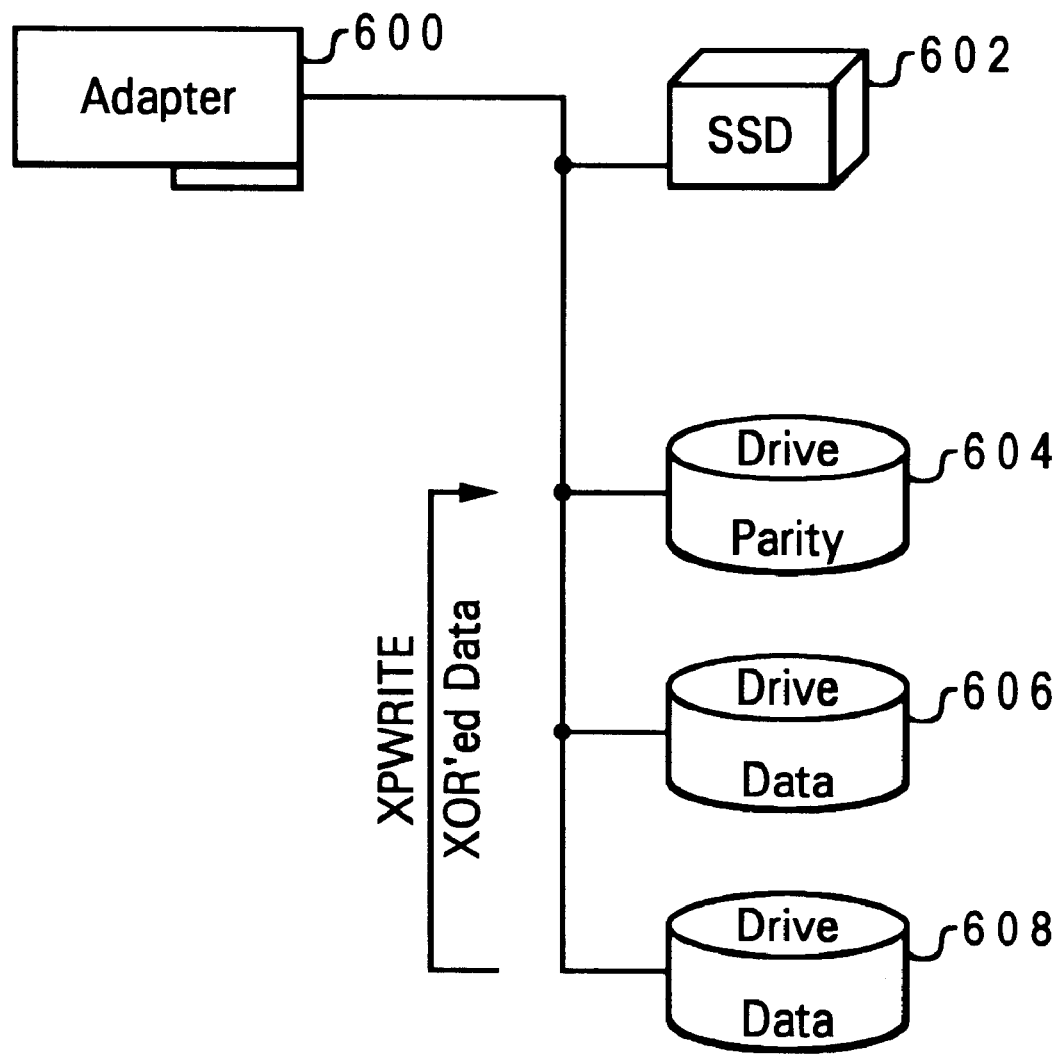

Referring now to FIGS. 6A, 6B, and 6C, block diagrams are depicted illustrating a process and configuration whereby the RAID commands are transferred to the RAID storage device in accordance with a preferred embodiment of the present invention. In FIGS. 6A, 6B, and 6C, adapter 600 is connected to SSD 602 and RAID drives 604, 606 and 608 by the DASD bus. The process that transfers the commands to the RAID storage device is explained in FIG. 7, which should be read in conjunction with FIGS. 6A, 6B and 6C.

Figure 7:
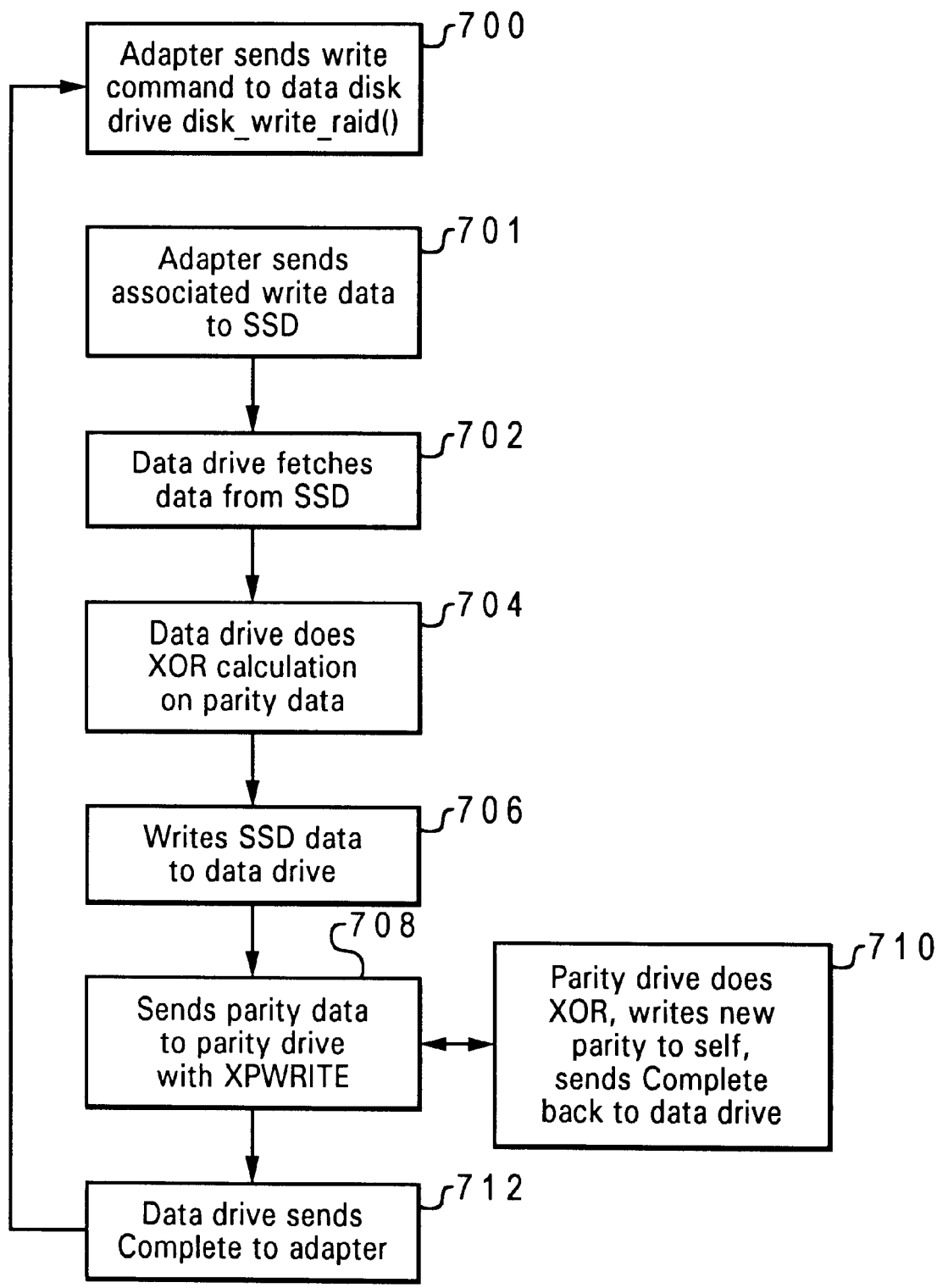
FIG. 7 is a high level flow diagram for a process for transferring the RAID commands to the RAID storage device in accordance with a preferred embodiment of the present invention.
Figure 8:
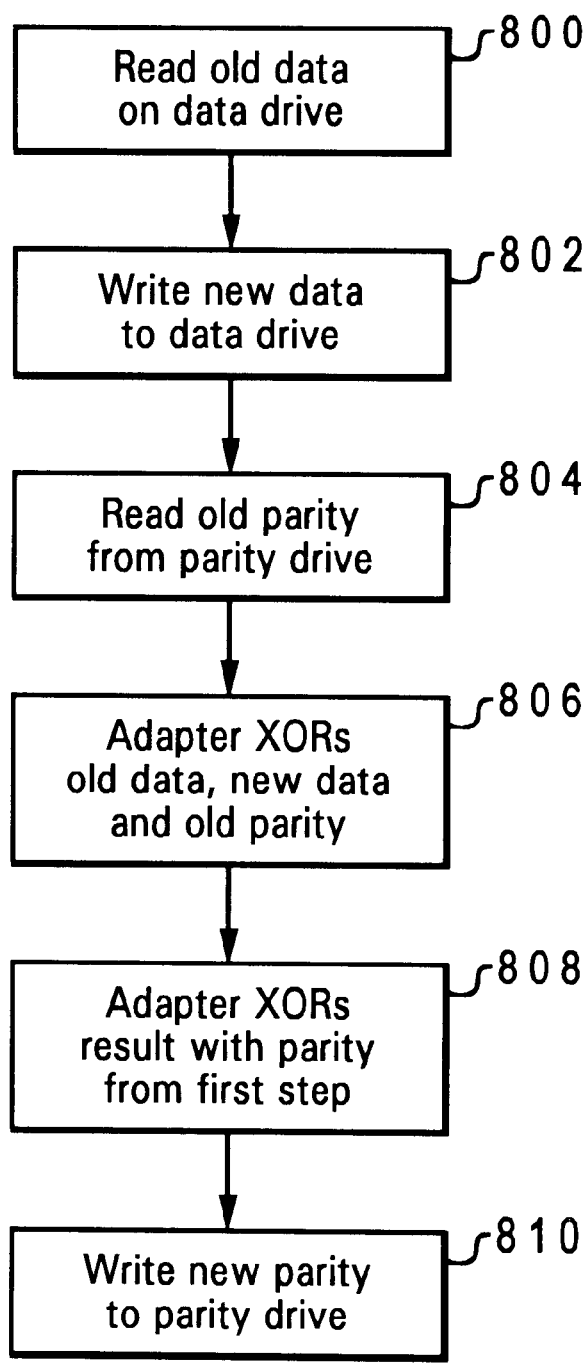
FIG. 8 is a flow diagram depicting the prior art steps of a write operation to a standard RAID storage device.

Turning now to FIG. 7, a process for transferring the RAID commands to the RAID storage device in accordance with a preferred embodiment of the present invention is depicted. The process begins at step 700, which depicts adapter 600 sending the new write command "disk_write_raid( )" to a data disk drive 604 of the RAID storage device. Parameters included in the disk_write_raid( ) command are the Logical Block Address ("LBA") of the data on the data drive, on the parity drive and the SSD. Also, included are the DASD bus addresses of the SSD and the parity drive, The write command issued by adapter 600 is without the associated write data sent from adapter 600 to SSD 602 as depicted at step 701, and is a command instructing data drive 604 to retrieve the data related to adapter 600 write command from the SSD 602.

The process passes to step 702, which illustrates data drive 604 fetching data from SSD 602. The process then passes to step 704, which illustrates data drive 604 performing the XOR calculation. The process passes next to step 706, which depicts the data drive writing the results to itself. The process then proceeds to step 708, which illustrates data drive 604 issuing an XPWRITE command to parity drive 608 and sending the parity data to parity drive 608. The process passes to step 710, which depicts parity drive 608 XORing the data received, writing the new data to itself, and sending a complete signal back to data drive 604. The process thus passes to step 712, which illustrates data drive 604 sending a complete signal to adapter 600.

Use of the write command, 'disk_write_raid( ), to transfer write functions to a data drive within the RAID storage device will reduce the accesses to the adapter by the RAID storage device and SSD. Data is stored on the SSD and the write functions are performed by the drives within the storage system. The adapter is accessed at completion when the data drive sends a 'complete' signal to the adapter.

It is important to note that while the present invention has been described in the context of a fully functional data processing system, those skilled in the art will appreciate that the mechanism of the present invention is capable of being configured many different ways. The SSD provides a large, fast memory extension to the adapter, which may be increased by adding more SSDs. The primary objective is to reduce the latencies caused by the storage devices in relation to the host system. Moving the RAID commands from the adapter to the SSD and further, to the RAID drives themselves, reduces the latencies by magnitudes.

Therefore, an apparatus and method for providing an extension to the adapter memory, which provides logic for relocating instructions from the adapter memory to the SSD and increasing the throughput of the adapter, are disclosed. Through the use of virtual memory addressing, the SSD memory addresses are represented. In addition, by relocating commands and data functions from the limited memory area on the adapter to the large memory area on the SSD, the throughput of the adapter is increased. Further, by relocating commands and data functions to a data drive in the RAID subsystem, the latencies between the drives and the data processing system are reduced.

While the invention has been particularly shown and described with reference to a preferred embodiment, it will be understood by those skilled in the art that various changes in form and detail may be made therein without departing from the spirit and scope of the invention.

What is claimed is:

1. A method for distributing, between a host bus adapter and a solid state disk, the execution staging of a write command issued from a host processor to a parity protected disk drive array, the host bus adapter providing an interface between a host system bus and a direct access storage device bus, the solid state disk coupled on the direct access storage device bus side of the host bus adapter, said method comprising:

extending nonvolatile memory of the host bus adapter by storing a range of memory addresses of the solid state disk within the host bus adapter;

responsive to the host bus adapter receiving a write command and associated write data from the host processor:

sending the write command directly from the host bus adapter to a data drive within the parity protected disk drive array; and sending the associated write data from the host bus adapter to the solid state disk;

retrieving the associated write data directly from the solid state disk into the data drive; and completing subsequent data and instruction transfers between the solid state disk and the parity protected disk drive array using XDWRITE, XDREAD and XPWRITE commands.

2. The method of claim 1, wherein the parity protected disk drive array includes a parity drive, said completing subsequent data and instruction transfers between the solid state disk and the parity protected disk drive array using XDWRITE, XDREAD and XPWRITE commands further comprising:

XOR'ing the associated write data retrieved from the solid state disk with data stored within the data drive to obtain XOR parity data; and writing the associated write data onto the data drive.

3. The method of claim 2, wherein the step of completing subsequent data and instruction transfers between the solid state disk and the parity protected disk drive array using XDWRITE, XDREAD and XPWRITE commands, further comprises:

sending the XOR parity data in association with an XPWRITE command to the parity drive; and returning a write complete message from the data drive to the host bus adapter.

4. The method of claim 3, further comprising:

sending a write complete message from the solid state disk to the host bus adapter.

5. A mechanism for distributing, between a host bus adapter and a solid state disk, the execution staging of a write command issued from a host processor to a parity protected disk drive array, the host bus adapter providing an interface between a host system bus and a direct access storage device bus, the solid state disk coupled on the direct access storage device bus side of the host bus adapter, said mechanism comprising:

means for extending nonvolatile memory of the host bus adapter by storing a range of memory addresses of the a solid state disk within the host bus adapter;

means responsive to the host bus receiving a write command and associated write data from the host processor for:

sending the write command directly from the host bus adapter to a data drive within said parity protected disk drive array; and sending the associated write data from the host bus adapter to the solid state disk;

means for retrieving the associated write data directly from the solid state disk into the data drive; and means for completing subsequent data and instruction transfers between the solid state disk and the parity protected disk drive array using XDWRITE, XDREAD and XPWRITE commands.

6. The mechanism of claim 5, wherein the parity protected disk drive array includes a parity drive, said means for completing subsequent data and instruction transfers between the solid state disk and the parity protected disk drive array using XDWRITE, XDREAD and XPWRITE commands further comprising:

means for XOR'ing the associated write data retrieved from the solid state disk with data stored within the data drive to obtain XOR parity data; and means for writing the associated write data onto the data drive.

7. The mechanism of claim 6, wherein the means for completing subsequent data and instruction transfers between the solid state disk and the non-volatile memory storage device using XDWRITE, XDREAD and XPWRITE commands, further comprises:

means for sending the XOR parity data in association with an XPWRITE command to the parity drive; and means for returning a write complete message from the data drive to the host bus adapter.

8. The mechanism of claim 7, further comprising:

a means for sending a write complete message from the solid state disk to the host bus adapter.

\* \* \* \* \*